Nov. 5, 1957
L. N. McKELVEY, JR
2,812,034
HORIZONTAL HIGH PRESSURE SEPARATOR
Filed March 29, 1955
3 Sheets-Sheet 1
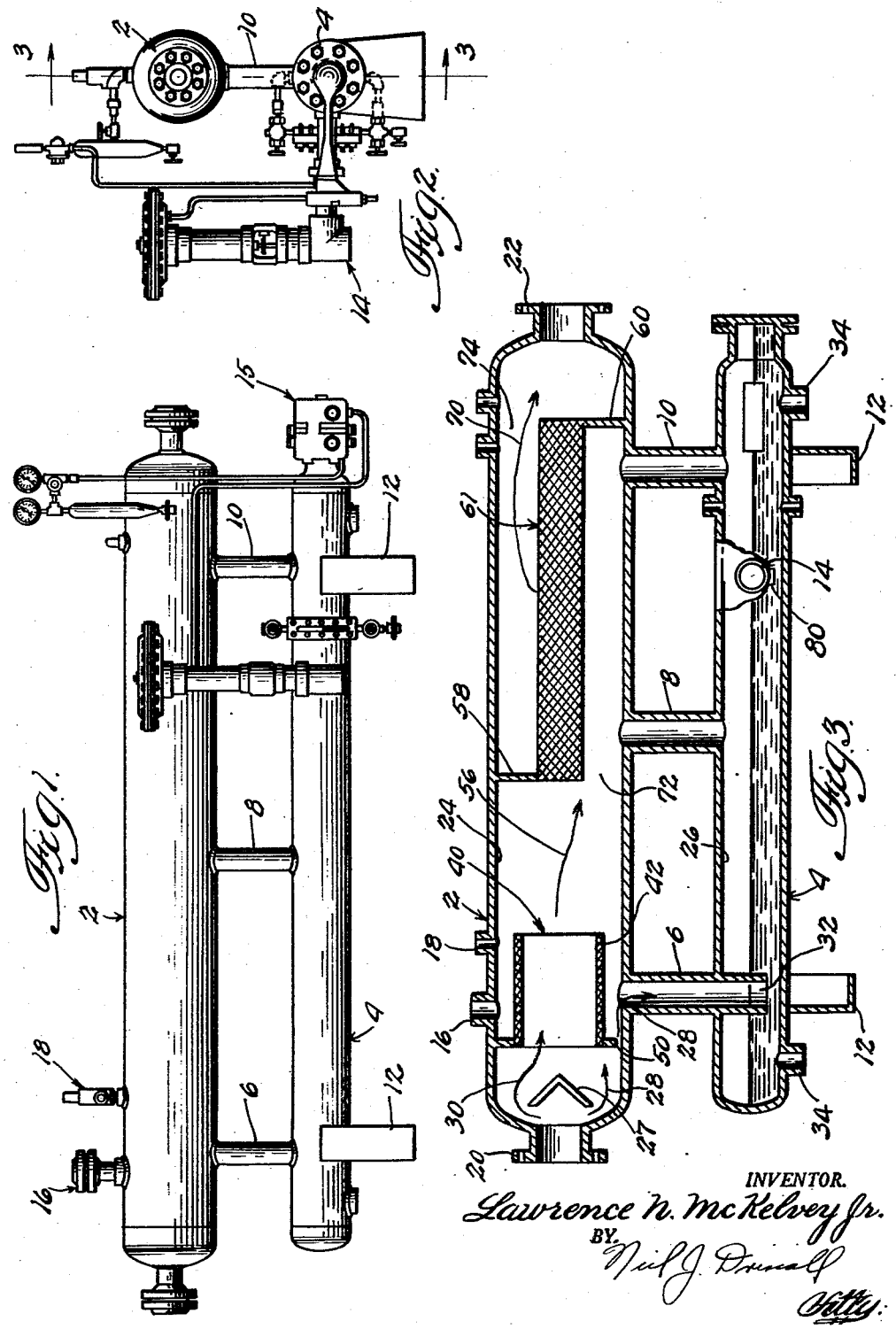
INVENTOR.
Lawrence N. McKelvey Jr.
BY Nov. 5, 1957  L. N. McKELVEY, JR  2,812,034
HORIZONTAL HIGH PRESSURE SEPARATOR
Filed March 29, 1955  3 Sheets-Sheet 2
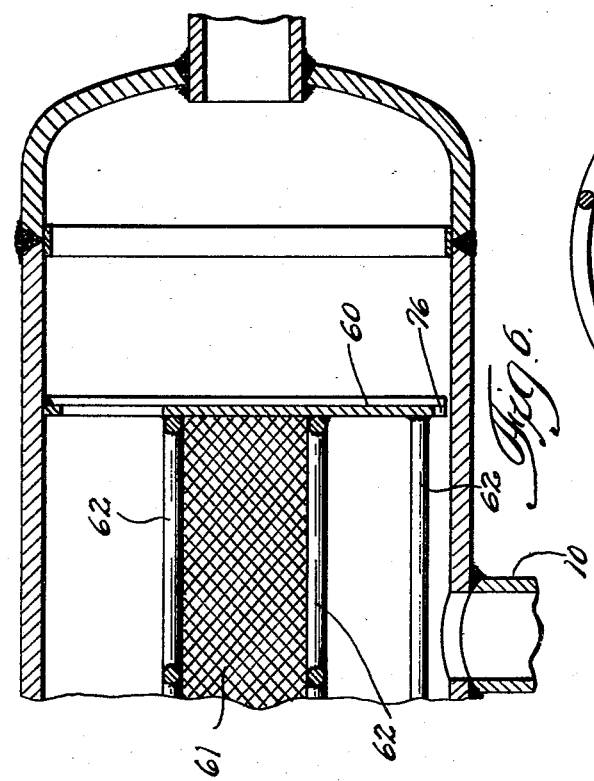
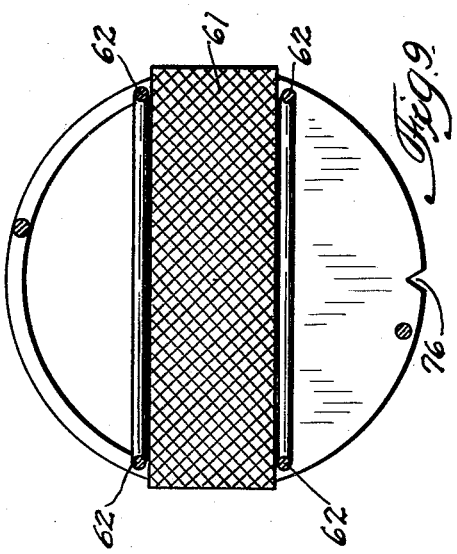
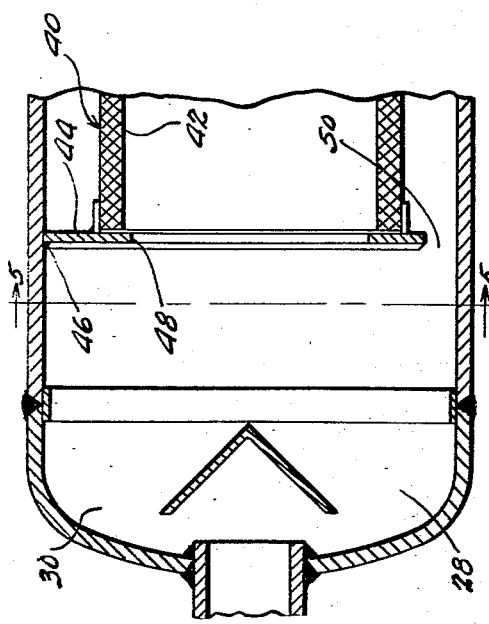
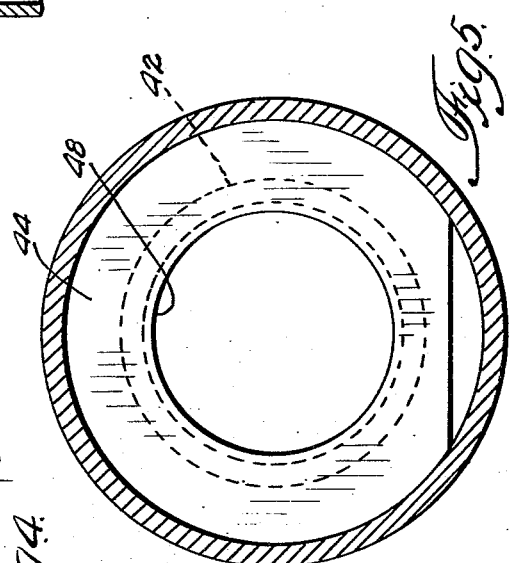
INVENTOR.
Lawrence N. McKelvey Jr
BY

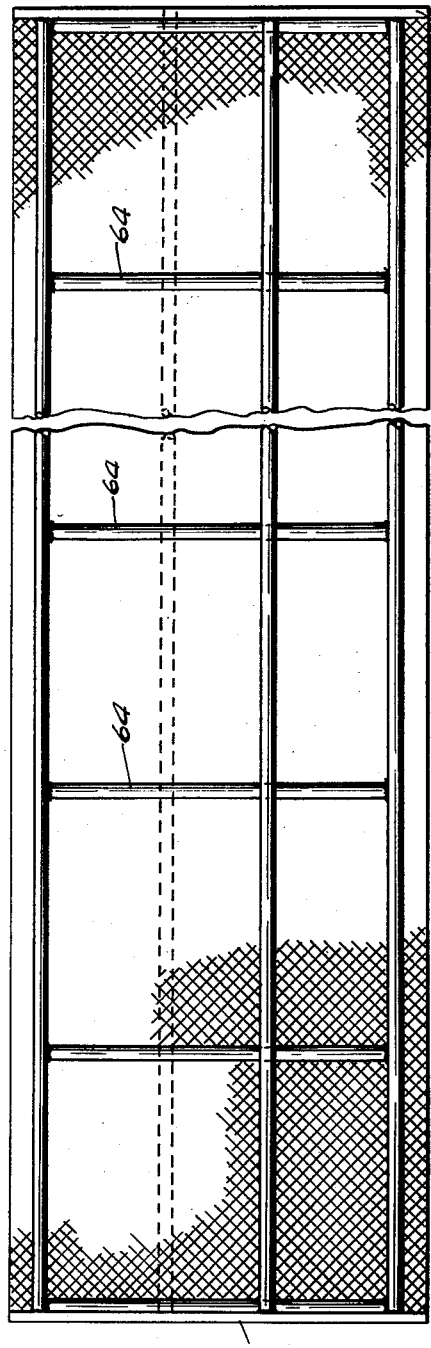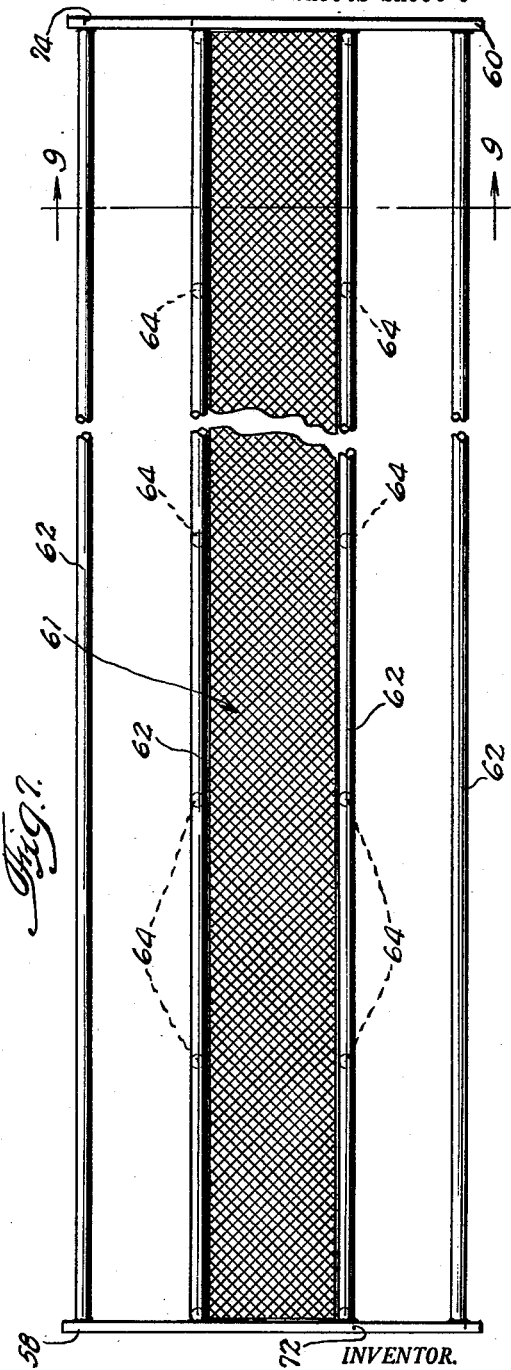

United States Patent Office 2,812,034
Patented Nov. 5, 1957

2,812,034

HORIZONTAL HIGH PRESSURE SEPARATOR

Lawrence N. McKelvey, Jr., Tulsa, Okla., assignor to Graver Tank & Mfg. Co., Inc., East Chicago, Ind., a corporation of Delaware Application March 29, 1955, Serial No. 497,583

1 Claim. (Cl. 183—2.7)

The invention relates to a new and novel apparatus and method for separating entrained liquids from gas and particularly relates to such apparatus when applied to the removal of gas from liquid in a product obtainable from petroleum wells.

The invention comprehends a separating method and apparatus to efficiently and effectively separate gas from the liquid petroleum product as produced in the field under high pressure conditions. The invention further comprehends the application of the invention to that type of separator known in the art as a horizontal high pressure separator.

It is the general object of the invention to provide a novel apparatus and method to effectively separate gas and liquid in a moving product and particularly to separate the entrained liquid in a moving gas.

It is a further object of the invention to provide an apparatus having a novel mist extractor arrangement whereby the entrained liquid in a passing gas is effectively and efficiently removed.

It is an additional object of the invention to provide a novel product flow arrangement which facilitates the removal of entrained liquid in a passing gas.

These and other objects of the invention will become apparent in the course of the following description and from an examination of the concerned drawings, wherein:

Figure 1 is a general side elevational view of the apparatus embodying the invention.

Figure 2 is an end elevational view, taken from the right, of the structure shown in Figure 1, Figure 3 is a sectional view, partly in elevation, taken along line 3—3 of Figure 2, Figure 4 is a detailed fragmentary view of the left hand end of the structure illustrated in Figure 3, Figure 5 is a sectional view taken along line 5—5 of Figure 4, Figure 6 is a fragmentary detailed view of the right hand portion of the structure illustrated in Figure 3, Figure 7 is a fragmentary detailed view illustrating the mounting of the secondary mist extractor shown generally in Figure 3, Figure 8 is a plan view of the structure shown in Figure 7 and Figure 9 is a sectional view taken along line 9—9 of Figure 7.

Describing the invention in detail and directing attention to Figure 1, it will be seen that the apparatus comprises a main vessel or cylinder 2, said cylinder 2 being preferably horizontally arranged relative to the earth's surface. Immediately below the cylinder 2 the apparatus comprises another longitudinally extended cylinder or vessel 4, it being understood that the long axes of the cylinders 2 and 4 are preferably parallel. A plurality of vertically extended pipes 6, 8 and 10 are arranged to interconnect the cylinders 2 and 4. The entire apparatus is supported by spaced feet or mounting members 12.

An oil outlet control mechanism indicated generally at 14, extends from one side of the lower cylinder 4 as is best seen in Figure 2, to provide a convenient means to withdraw and to control the level of the liquid after processing in the apparatus. The arrangement is further provided with pressure indicating and quality control equipment indicated at 14, such equipment being conventional and familiar to those skilled in the art. The upper vessel 2 is provided with a safety head at 16 and a safety valve 18, as is well understood by those skilled in the art.

Directing attention to Figure 3, which illustrates the internal construction of the arrangement employed, it will be seen that the cylinder 2 is provided with a product inlet port 20, preferably at the left side thereof. As earlier noted the vessel 2 is preferably cylindrical in form and has a long axis arranged generally horizontally. At the other end of the vessel 2 a gas outlet port 22 is provided. At the lower edge of the vessel 2, as illustrated in Figure 3, the pipes 6, 8 and 10 interconnect the vessels 2 and 4 and provide passage means establishing communication between an internal compartment 24 of the upper vessel 2 and an internal compartment or reservoir 26 of the lower vessel 4. A function of these several passage means hereinafter will be more fully described.

Considering the left hand end of the upper cylinder 2, it will be seen that a V-shaped inlet baffle or diverter 26 is fixedly mounted adjacent and immediately inwardly of the inlet port 20. With the baffle 26 thus positioned, it will be understood that the product entering the tank at the port 20 will impinge on the baffle, whereby the velocity of the product, it being understood that the product is under relatively high pressure, is considerably reduced. The baffle or diverter 26 additionally performs the general function of dividing the flowing product into substantially two identifiable streams, the first comprising the relatively heavy liquid, which is urged to flow downwardly toward the bottom of the vessel 2 and into the pipe 6 whereby the liquid is carried to the chamber 27 of the vessel 4 as indicated by the arrows 28, 28. The diverter 26 additionally resists the entrance of sand or other abrasive material into the main chamber 24 of the vessel 2, thereby materially aiding in the prevention of erosion of the walls of the vessel or the other apparatus contained therein due to the action of these abrasives. The abrasives strike the diverter 26 and drop downwardly to be carried through the pipe 6 into the left hand end of the vessel 4, it being understood that the flow of the heavier liquid heretofore mentioned will materially aid in carrying the abrasives as indicated.

The diverter 26 additionally divides the incoming product into another or primarily gaseous stream which flows upwardly from the diverter 26 as indicated by the arrow 30. This primarily gaseous stream is carried through the vessel 2 and is subjected to the treatment hereinafter described.

It will be noted that the pipe 6 extends into the vessel 4 and is provided with an opening 32 located adjacent the bottom of vessel 4. With the opening so located the passing liquid, mentioned above, tends to deposit the carried abrasive material on the bottom of the vessel 4, whereby said material may be easily removed by means of drains 34, 34.

It is well understood by those skilled in the art that when gas is passed through and associated with a liquid and especially when the end product is under pressure, the gas upon bursting from the liquid surface will carry with it fine droplets of the liquid, creating a mist. The droplets of liquid thus carried will vary in size from relatively large particles to smaller particles almost microscopic in size. These fine particles of liquid will be carried by the moving gas and will not disassociate themselves from the gas even under the action of gravity. It is this condition that the herein disclosed invention is designed to correct, in that the apparatus and method here employed effectively separate these entrained droplets of liquid from the gas.

As noted above, the diverter 26 causes the formation of a gas stream 30, said stream 30 having entrained therein the mentioned droplets of liquid. Immediately adjacent the diverter 26 a primary mist extractor, indicated generally at 40 is mounted in the vessel 2.

Directing attention to Figures 4 and 5, it will be seen that the primary extractor 40 is preferably of cylindrical form and is composed of continuous strips of overlying layers of expanded mesh-like material 42, which are secured to a plate 44, which in turn is peripherally welded, as at 46, to the internal surface of the chamber 24. The layers of mesh-like material are arranged to provide a plurality of non-linear passages through the extractor to accommodate flow of the mist. The plate 44 is provided with an aperture 48 which accommodates flow of the mist therethrough and into the primary mist extractor 40. It will be particularly noted that the mounting plate 44 is not continuously peripherally secured to the internal surface of the chamber 24, but is provided with an aperture or opening 50 adjacent the lower surface of the chamber 24 thus accommodating the liquid flow hereinbefore mentioned and indicated by the arrows 28. It will be noted that the plate 44 tends to restrict the flow of the heavy liquid in that the liquid will tend to build up to the left of the plate and thus prevent a surge of liquid that would rush down to the relatively dry or right hand portion of the chamber 24. The flow of liquid 28 is therefore relatively smooth being restricted by the size of the aperture 50.

As the gas product flows radially through the primary mist extractor 40, portions of the flowing product are caused to impinge on surfaces provided by the meshed or irregularly apertured material 42. This action causes the relatively heavy droplets of entrained liquid to be scrubbed from the gas and to combine and fall to the lower portions of the chamber 24, where they may be readily carried through the pipe 6 into the chamber 26 provided by the lower vessel 4. The primary mist extractor 40 also acts as a foam breaker when such conditions exist in the entering product, in that the extractor will hold back the excessive foam and will break it up as it passes through. The gas, passing through the primary mist extractor, will, as a result of such passing be spread out evenly over the entire diameter of the gas separating chamber, thereby substantially eliminating turbulent flow and providing for a quiescent axial movement through the balance of the chamber 24.

The gas is urged to continue to flow through the chamber 24 and in a direction substantially parallel to the longitudinal axis of the vessel 2 as indicated by the arrow 56. Approximately centrally of the chamber 24 a vertical wall 58 is provided. At the right end of the chamber 24 another vertical wall 60 is provided, the walls 58 and 60 being generally parallel and spaced from each other longitudinally of the vessel 2.

Directing attention to Figures 6 through 9, it will be seen that the walls 58 and 60 are arranged to support the secondary mist extractor indicated generally at 62. The spaced plates 58 and 60 are interconnected by a plurality of longitudinal bars 62, 62. Certain of the bars 62 are interconnected by transverse bars 64, 64 as will be seen in Figures 7 and 8. The intermediate longitudinal bars 62 and their connecting transverse bars 64 thus provide upper and lower confining elements for the interposed mist extractor 61.

The mist extractor per se comprises a plurality of layers of apertured mesh material, the apertures being arranged in such a manner as to provide non-linear irregular passages through the extractor. In the preferred embodiment the apertured material may be constructed of a wire mesh of stainless steel or Monel composition, whereby the corrosion problem is minimized. It will be noted that the extractor is arranged to extend longitudinally of the chamber 24, thus providing a relatively large straining or filter area and containing a maximum surface for contacting the passing gas and entrained liquid. By providing the extractor with non-linear passages therein, it is impossible for the gas to pass therethrough without continuous change in direction of motion. It will also be noted that the extractor 61 is arranged to extend from one side of the chamber 24 to the other side (Figure 9), thereby assuring that all of the passing gas product will be forced through the extractor.

As the gas and entrained liquid mist are urged upwardly through the extractor 61, they are forced to impinge on the surfaces provided in the extractor, whereby the droplets of liquid carrying the gas will be retained on the extractor due to the scrubbing action of the passing gas and the adhesion effect of the material in the extractor on the droplets of liquid in the gas. Again the relatively fine droplets of liquid in the gas are caused to coalesce on the extractor surfaces until they have reached sufficient size that the force of gravity will urge them to pass downwardly through the extractor and toward the bottom of the chamber 24 whereat they are carried in liquid form through the passages 8 and 10 and into the chamber 26 of the lower vessel 4. The relatively liquid free gas is then carried longitudinally of the chamber 24 toward the outlet 22 whereat it leaves the apparatus. This flow is indicated by the arrow 70.

It should be noted that the plate 58 may be peripherally secured to the internal surface of the chamber 24 by welding or other suitable means and that the plate 58 is provided in its lower portion with an opening 72 which accommodates flow of the gas product to that portion of the chamber 24 below the extractor 61. The plate 60 may also be peripherally secured in any suitable manner to the internal circumference of the chamber 24 and is provided with an aperture 74 adjacent its upper end to accommodate the flow of the relatively dry gas to the gas outlet 22.

Directing attention to Figure 6, it will be seen that the plate 60 is provided with a small notch or opening 76 whereby communication is established between opposite sides of said plate. Thus, if any liquid should separate from the gas immediately before the outlet port 22, it will not collect in the bottom of the chamber 24 at the right hand end thereof but will flow along said bottom to the passage 10 whereat it will be carried to the chamber 26 of the vessel 4.

It should be noted that the particular arrangement of the extractor 61 provides a relatively extensive surface area to "wipe" the liquid from the gas. Additionally, the fact that the extractor 61 is arranged as it is, accommodates downward movement of the coalesced liquid which has a cleansing effect on the extractor 61 and hence tends to make it self-cleansing, thereby reducing the possibility of extractor clogging. The relatively large area of the extractor 61 and its provision for a relatively great number of passageways therethrough provides for a high capacity with a minimum restriction of flow, hence a minimum of pressure drop due to passage through the extractor. The non-linear relation of the passageways within the extractor 61 provides for a substantially continual change in direction of the flow of the passing gas, whereby the scrubbing action on the passing gas is materially increased, thereby increasing the effectiveness of mist removal.

It will also be understood that the particular arrangement of the secondary mist extractor 61 relative to the primary mist extractor 40 provides for a change in direction of the general flow of the product through the chamber 24, in that the overall effective flow through the primary extractor 40 is primarily longitudinal and parallel to the axis of the chamber 24 and that the general flow through the extractor 61 is substantially perpendicular to the longitudinal axis of the chamber 24. This substantial change in direction of motion of the passing gas from a horizontal to a vertical direction brings the force of gravity more strongly into play to act on the droplets of liquid contained in the gas, thereby increasing the efficiency of the mist removal. It is this general liquid flow control of the product through the chamber 24 that is one of the novel features of the herein disclosed invention.

Directing attention to vessel 4, it will be seen that the particular horizontal arrangement of the chamber 26 provides a reservoir of the oil of rather shallow depth and large surface area. This large surface area more readily accommodates the bubbling out of any gas that may be entrapped in the liquid in the chamber 26. This gas may then escape through the passages 8 and 10 into the upper chamber 24 and into the normal gas flow. The oil outlet 14 is provided with a downwardly extending baffle 80, as seen in Figure 3, which assures oil removal from the chamber 26 at a point below the surface of the liquid level in the chamber. This prevents any inadvertent withdrawing of gas with the liquid.

Thus it will be seen that I have provided a novel method and apparatus which efficiently and effectively divides a product into its liquid and gas components, each being free of contamination by the other.

I claim:

In an apparatus for completely dividing a product into its associated components of liquid and gas, said apparatus comprising a pair of horizontally arranged cylinders, one of said cylinders being an upper cylinder and the other being a lower cylinder, a product inlet port at one end of the upper cylinder, a V-shaped diverter mounted in the upper cylinder adjacent the inlet port with the open end of the V facing the inlet port to divide the product into flowing gas and liquid streams, passage means accommodating flow of the liquid stream to the lower cylinder, and a pair of mist extractors arranged in series in the upper cylinder and in spaced relation to each other to intercept the flow of the gas stream and to remove therefrom any carried droplets of liquid, said extractors comprising a first extractor annularly arranged to surround the axis of the upper cylinder and composed of a plurality of layers of mesh material affording non-linear passageways therethrough and accommodating flow generally radially of the upper cylinder, a pair of baffle plates mounted in the upper cylinder in spaced relation to each other and in perpendicular relation to the axis of the upper cylinder, a second mist extractor suspended between the baffle plates and longitudinally arranged relative to the axis of the upper cylinder to accommodate flow transversely of said axis, passage means in the respective baffle plates and on opposite sides of the upper cylinder, said second extractor comprising a plurality of layers of meshed material defining non-linear passages therethrough, said second extractor having a cross-sectional area greater than the cross-sectional area of the upper cylinder and a gas outlet port at the other end of the upper cylinder accommodating the egress of liquid free gas from the upper cylinder.

References Cited in the file of this patent

UNITED STATES PATENTS

| | | |
|---|---|---|
| 1,560,790 | Jordahl | Nov. 10, 1925 |
| 2,349,944 | Dixon | May 30, 1944 |
| 2,511,967 | Campbell | June 20, 1950 |
| 2,521,785 | Goodloe | Sept. 12, 1950 |
| 2,614,648 | Wilson | Oct. 21, 1952 |
| 2,657,760 | Glasgow | Nov. 3, 1953 |